United States Patent [19]

Scragg et al.

[11] 4,026,112
[45] May 31, 1977

[54] SOLAR REACTOR ENGINE

[76] Inventors: Robert L. Scragg; Alfred B. Parker, both of 2937 SW. 27th Ave., Miami, Fla. 33133

[22] Filed: Feb. 10, 1976

[21] Appl. No.: 657,383

Related U.S. Application Data

[63] Continuation-in-part of Ser. No. 588,888, June 20, 1975, which is a continuation-in-part of Ser. No. 564,087, April 1, 1975.

[52] U.S. Cl. .................................. 60/641; 60/673; 126/263
[51] Int. Cl.² ......................................... F03G 7/02
[58] Field of Search ............. 60/641, 673; 126/270, 126/271, 263

[56] References Cited

UNITED STATES PATENTS 3,302,401  2/1967  Rockenfeller .................. 60/673 X

*Primary Examiner*—Allen M. Ostrager
*Attorney, Agent, or Firm*—Cushman, Darby & Cushman

[57] ABSTRACT

A solar reactor engine is disclosed which includes a concrete or other suitable housing having a reactor chamber therein. In one embodiment, the reactor chamber is cylindrical. A solar intensifier, such as a parabolic reflector, is mounted on top of the reactor housing. The parabolic reflector collects and intensifies solar rays and guides them down through a solar sight glass, mounted on top of the housing, into the reactor chamber. The concentrated beam of light is directed onto a reflector cone within the reactor chamber which disperses solar rays throughout the chamber. Hydrogen and chlorine are conducted into the reactor chamber and react with controlled explosive violence when exposed to the solar rays. Atmospheric oxygen is used as a control medium to regulate the energy given off by the reaction of the hydrogen and chlorine in the presence of solar energy. The heat and pressure thus formed are utilized to drive a turbine, the output of which is utilized to drive a suitable utilization device. In another embodiment of the invention, the solar reactor engine is housed in a metal or other suitable housing so that the reactor engine can be utilized for propulsion or mobile applications.

13 Claims, 5 Drawing Figures

SOLAR REACTOR ENGINE

BACKGROUND OF THE INVENTION

This invention is a continuation-in-part of copending application Ser. No. 588,888, filed June 20, 1975, which in turn is a continuation-in-part of copending application Ser. No. 564,087, filed Apr. 1, 1975, and titled Solar Reactor Steam Generator Method and Apparatus. The subject matter of these applications is incorporated herein by reference thereto.

This invention relates to reactors and turbines and more particularly is related to solar reactors and gas turbines which utilize the controlled energy developed by the combination of hydrogen and chlorine in the presence of solar energy to convert this photo-chemical energy into mechanical and/or electrical power.

In the process of converting energy into mechanical and electrical power, many forms of primary movers, i.e. energy converters, have been utilized. The most widely used converters are gasoline and diesel engines, jet engines and gas turbine engines. All of these engines convert fossil fuel into kinetic energy which is then converted directly to mechanical power. Another example of a common converter commonly used in the art is the steam boiler. The steam boiler converts fossil energy into kinetic energy which is then converted to mechanical power by means of steam turbines. It is a characteristic of all of the above-identified energy converters that their efficiency does not exceed 40%. Thus, only 40% of the input BTUs in fuel is converted to output horsepower. Further, each of the aforementioned engines operates with detrimental environmental effects; and all are dependent upon fossil fuels or refined fossil fuels which require tremendous capital investments for recovery, refining and distribution.

It therefore is an object of this invention to provide a method for converting photo-chemical energy to mechanical and/or electrical power in sufficient quantity for direct or supplemental utility operation.

It is another object of this invention to provide a method of utilizing fuels and reactants, which can be produced by electrolysis cells and stored wherever electrical power is available, whether it be in stored or generated capacity.

It is yet another object of this invention to provide a method of utilizing the explosive energies of reactant gases such as hydrogen and chlorine to drive a gas turbine or any engine that requires explosive gases for expansion of pistons or rotors.

It is another object of this invention to provide a method of evacuating or scrubbing exhaust gases to thereby reduce the heat and back pressure of an internal combustion engine resulting in higher efficiencies for the engine.

It is yet another object of this invention to provide a method of generating power in the form of a prime mover or electrical generator which generates no harmful emissions.

It is yet another object of this invention to provide a method of generating power in the form of a prime mover or electrical generator which is more efficient than existing energy converters.

Another object of this invention is to provide a method of generating power in the form of a prime mover or electrical generator that does not utilize fossil or nuclear fuels which may potentially pollute or otherwise harm the environment about the generator.

SHORT STATEMENT OF THE INVENTION

Accordingly the present invention is related to a solar reactor engine which includes a solar reactor chamber having means for controllably coupling chlorine and hydrogen thereto. A parabolic reflector or other suitable focusing means is positioned with respect to the reactor chamber and is controlled by an automated azimuth tracker. The parabolic reflector concentrates the solar rays into an intense focal point reflector which reflects the solar beam via a series of reflectors through a solar sight glass and into the reactor chamber. The beam of light passes through the reactor chamber and onto the surface of a conical reflector at the base of the chamber which disperses the solar rays throughout the chamber. The hydrogen and chlorine coupled to the reactor chamber exothermicly react to generate hydrogen chloride at high temperature and pressure level. Atmospheric oxygen is used as a control mechanism to regulate the energy given off by the reaction of the hydrogen chloride in the presence of solar energy. A turbine is positioned on at least a portion of at least one wall of the reactor chamber with the pressurized hydrogen chloride driving the turbine. An exhaust chamber is positioned on the opposite side of the turbine from the reactor chamber wherein the hydrogen chloride is converted to hydrochloric acid to thereby form a partial vacuum in the exhaust chamber. The partial vacuum has the effect of creating an increased pressure differential across the turbine to thereby increase the efficiency of operation of the turbine. The hydrochloric acid is conveyed away from the exhaust chamber.

In another aspect of the invention, batteries are provided for generating an electrical current which is coupled to a chlorine-sodium hydroxide electrolysis cell. The electrical current coupled to the electrolysis cell causes the generation of chlorine and hydrogen therein which is coupled to the solar reactor. At the output of the exhaust chamber of the reactor engine the hydrochloric acid is reacted with sodium hydroxide to thereby produce water and sodium chloride. The water and sodium chloride are coupled back to the chlorine and sodium hydroxide electrolysis cell so that the cycle is continuously repeated.

BRIEF DESCRIPTION OF THE DRAWINGS

Other objects, features and advantages of the invention will become more fully understood from the following detailed description of the preferred embodiment, the appended claims and the accompanying drawings in which:

DETAILED DESCRIPTION OF THE EMBODIMENTS

Throughout the detailed description of the embodiments of the present invention, like numerals will correspond to like elements in the Figures.

Figure 1:
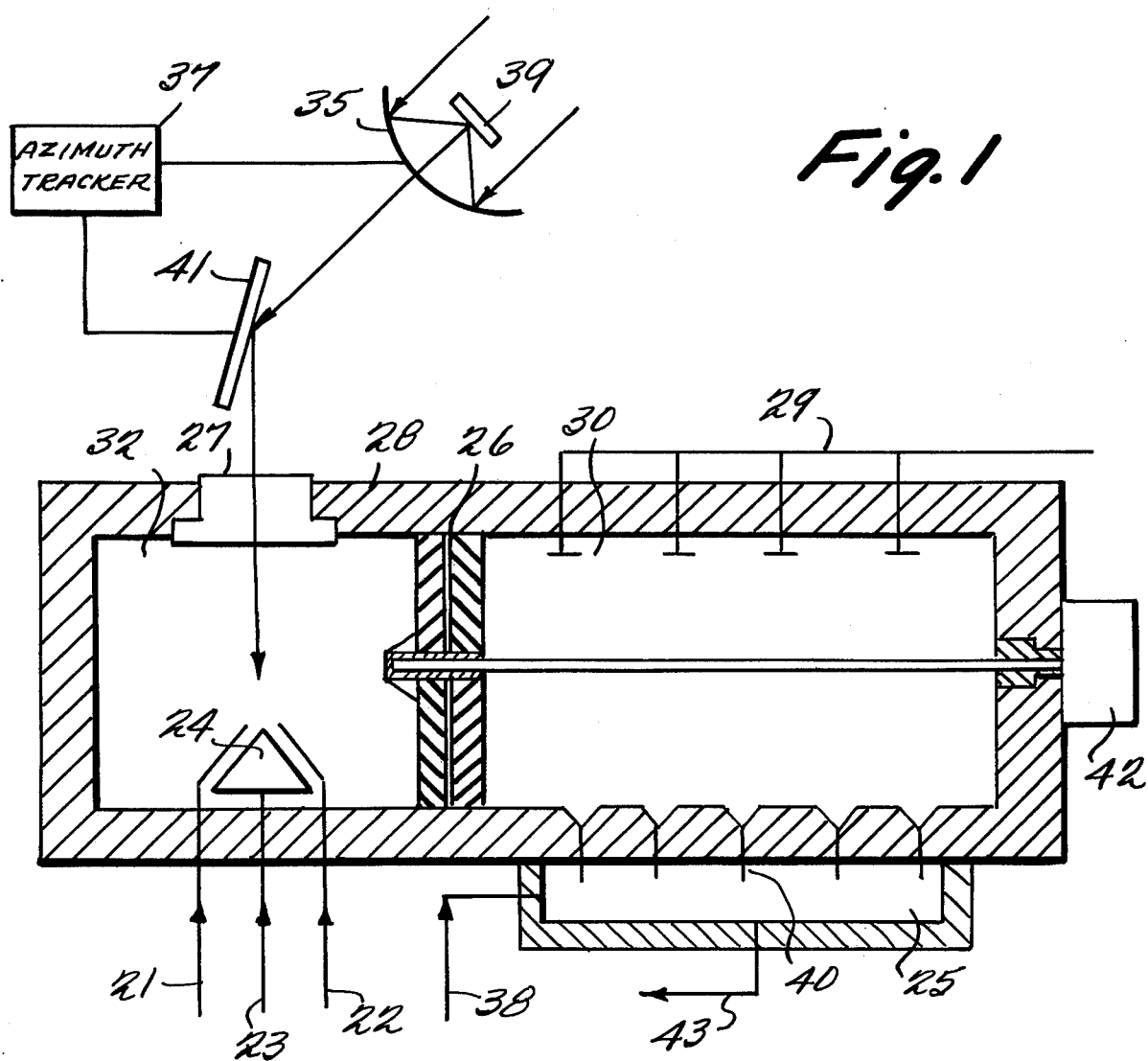
FIG. 1 is a simplified section view taken in elevation of a preferred embodiment of the solar reactor engine of the present invention.

Refer now to FIG. 1 where there is disclosed a simplified section view of one embodiment of the solar reactor engine of the present invention. Fuel and/or reactants are fed into a solar reactor chamber 32 via tubes 21 and 22. In the preferred embodiment chlorine is fed into the reactor via tube 22 and hydrogen via tube 21 at controlled rates. Atmospheric oxygen is fed into chamber 32 via tube 23 under the base of a conical reflector 24.

Solar rays are concentrated and intensified by an azimuth tracking parabolic reflector system such as is well known in the art. Solar radiation is received by a parabolic reflector 35 which tracks the sun by means of a conventional azimuth tracker 37. The parabolic reflector concentrates the solar rays into a focal point reflector 39 which reflects the intense solar beam via reflector 41 through a solar sight glass 27 which may, for example, be of the convex or double convex lens type. The intensified solar rays are directed downward through solar sight glass 27, which is encased within the reactor chamber wall 28, and onto the surface of conical reflector 24, which disperses the intense solar rays onto the surface of the reactor walls. It should also be understood that reflector 24 can have a flat or convex shape if desired. Hydrogen and chlorine gas emitted into the chamber 32 via tubes 21 and 22, respectively, react with controlled explosive violence creating hydrogen chloride gas and intense heat and pressure within chamber 32. The explosive pressures and heat thus generated are exhausted from chamber 32 into a vacuum reactor chamber 30 via gas turbine assembly 26. The atmospheric oxygen coupled to the chamber via line 20 serves as a control medium to regulate the energy given off by the reaction of the hydrogen and chloride in the presence of the solar energy. The gas turbine assembly may be of any suitable type known in the art depending of course on the power levels generated. As the hydrogen chloride gas enters the vacuum reactor chamber 30, tubes 29 generate water jets which spray into the chamber. Five hundred volumes of hydrogen chloride combine instantly with one volume of water and form hydrochloric acid. The reaction evacuates the chamber instantly, leaving hydrochloric acid in the base of the chamber. The hydrochloric acid drops via ports 40 into a sodium hydroxide-hydrochloric acid reactor 25. The sodium hydroxide is fed into reactor 25 via tube 38 from a chlorine-sodium hydroxide cell. The hydrochloric acid is mixed with the sodium hydroxide, producing water and sodium chloride. The water and sodium chloride are fed from reactor 25 to a chlorine-sodium hydroxide cell, via tube 43. The water and sodium chloride are converted into fuel and/or reactants, hydrogen and chlorine, and sodium hydroxide. The process is continuously repeated.

The heat and pressure from reactor chamber 32 provide explosive energies to drive turbine assembly 26, which in turn drives a power generator via power take off 42. The evacuation chamber 30 converts the exhaust gas, hydrogen chloride, into hydrochloric acid, creating a vacuum exhaust, increasing the efficiency of turbine assembly 26, and eliminates the necessity of atmospheric exhaust.

Figure 2:
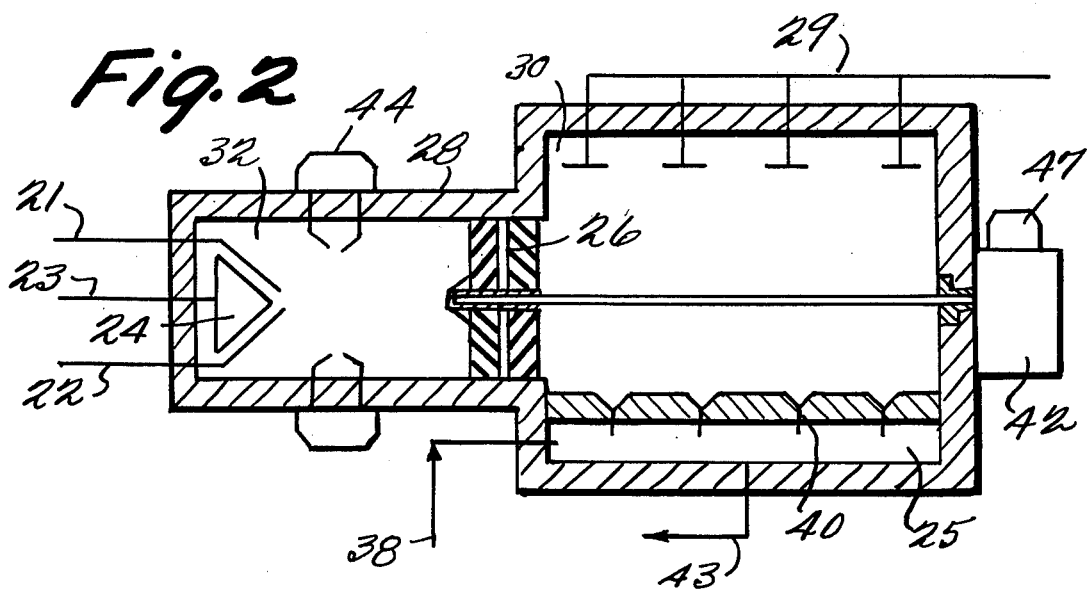
FIG. 2 is a simplified section view taken in elevation of another embodiment of the solar reactor engine of the present invention.

Refer now to FIG. 2 where there is disclosed an alternative embodiment of the solar reactor engine of the present invention. In this embodiment the housing 28 is formed of a metallic material such as in a standard gas turbine engine wherein the engine is designed for propulsion or other mobile applications. The reactants such as hydrogen and chlorine are supplied by means of storage containers or can be generated on a continuous basis. In this embodiment rather than utilizing solar energy for sustained reaction in the reaction chamber 32, the light is generated by, for example, carbon arc ignitors 44 and other high intensity light sources. As before, the light generated by the high intensity light source 44 is directed into the chamber 32 and against the conical reflector 24. The light is thus dispersed against the walls of the reaction chamber 32 to thereby sustain the combination of chlorine and hydrogen to form hydrogen chloride. The hydrogen chloride thus formed is at a high temperature and pressure level and is thereby forced through turbine blades 26 into the exhaust chamber 30. The turbine blades 26 are thereby rapidly driven with the mechanical energy thus generated coupled to a power take off 42 which may drive a mechanical means for moving a vehicle and in addition a portion of the mechanical power may be utilized to drive a generator 47. In the exhaust chamber 30, water is dispersed through tubes 29 to combine with the hydrogen chloride to form hydrochloric acid. This acid is conveyed away from the exhaust chamber 30 into a container 25. By combining the HCl with water a partial vaccum is created in the exhaust chamber 30 which assists in driving the turbine 26 because of the increased pressure differential thereacross.

Figure 3:
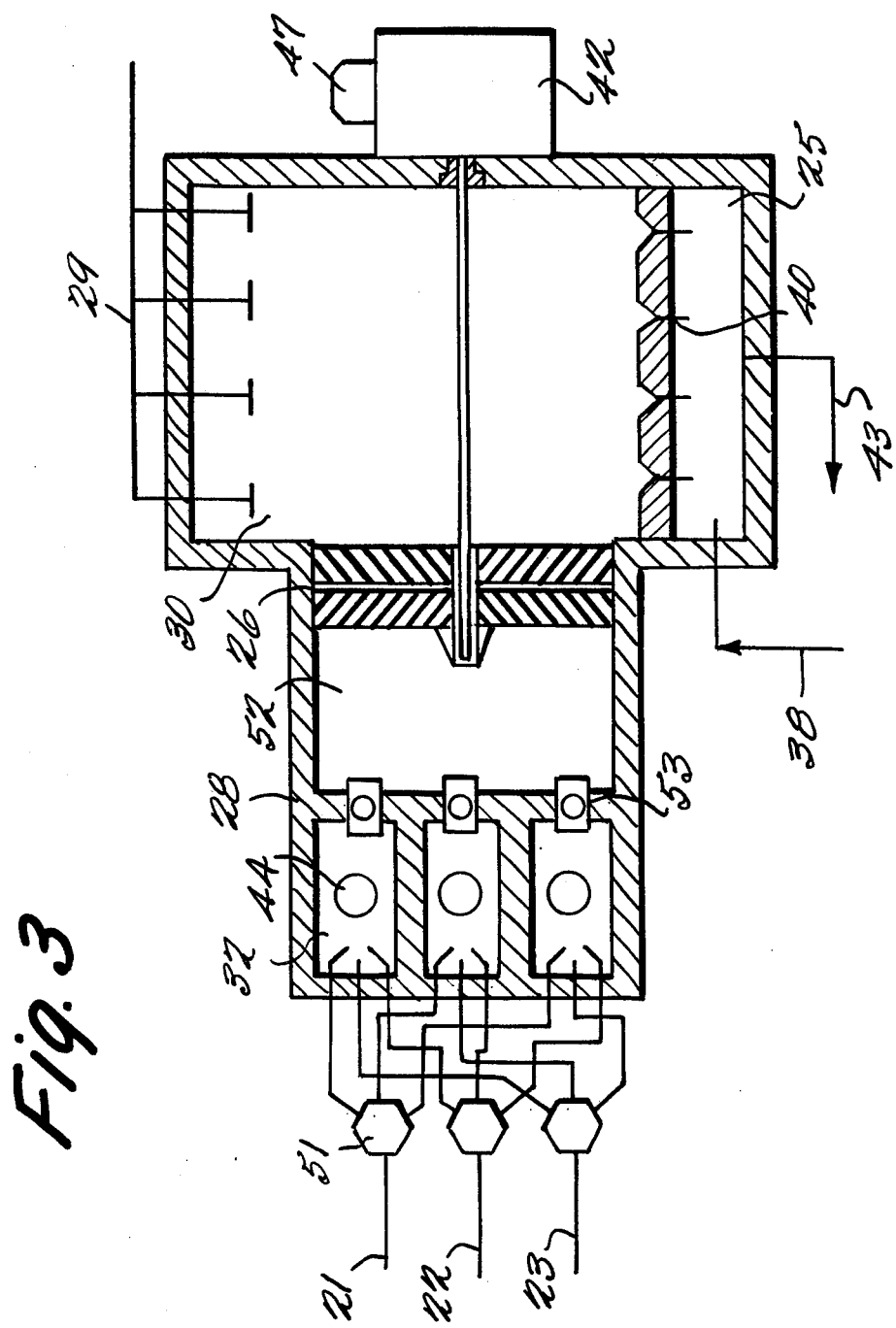
FIG. 3 is a simplified section view taken in elevation which illustrates another embodiment of the solar reactor engine of the present invention.

Refer now to FIG. 3 which is an alternate embodiment of the solar reactor engine of the present invention. As illustrated in this embodiment more than one reactor chamber is provided with each of the reactor chambers having hydrogen and chlorine coupled thereto together with atmospheric oxygen for control purposes via select valves 51 which are sequentially operated. Each of the reaction chambers 32 has light energy coupled thereto from arc ignitors 44 or from concentrated solar energy. The combustion gases, hydrogen coupled through line 21 and chlorine coupled through line 22, expand through check valves 53 into an expansion chamber 52. In this arrangement initial combustion is sequentially provided by each of the reactor chambers 32, the output of which is coupled to the expansion chamber 52 thereby increasing the volume in expansion chamber 52. As in the previous embodiments, the high pressure hydrogen chloride thus formed drives the turbine 26, which in turn powers a take off unit 42 and a generator 47.

Figure 4:
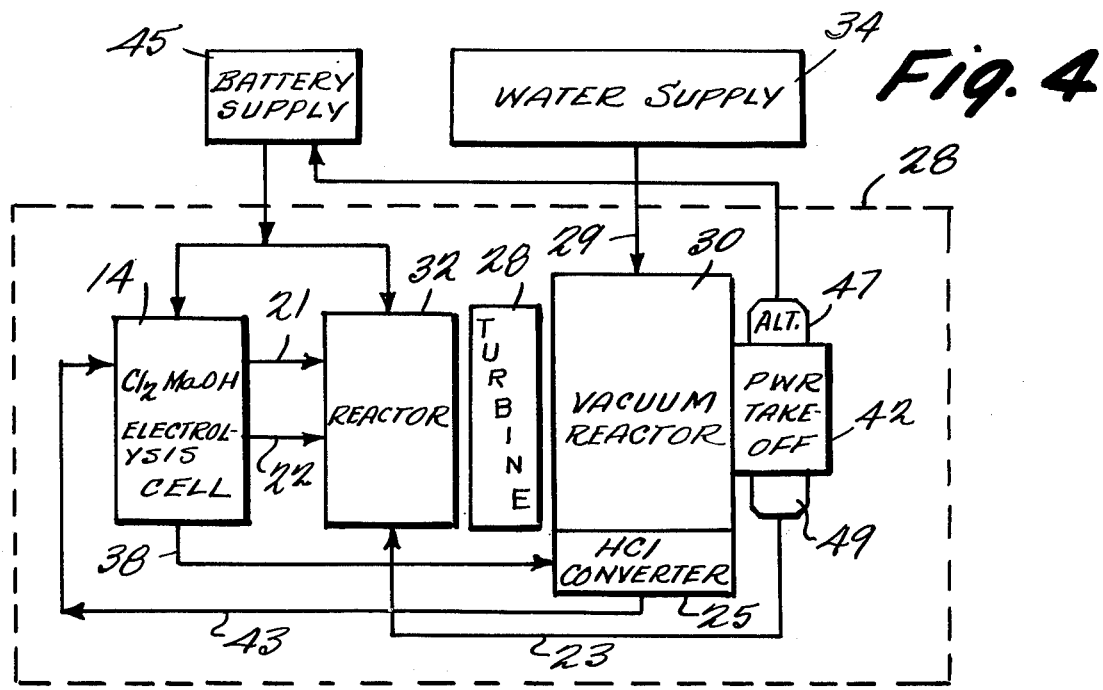
FIG. 4 is a block diagram of the solar reactor engine illustrating the reactant producing process and power producing process capable of operation in a mobile or stationary configuration using storage batteries and water.

Refer now to FIG. 4 where there is disclosed a block diagram of the solar reactor engine of the present invention wherein the solar reactor engine is formed as a part of an electrical utility power generation and storage system. The generation system is fully explained in copending U.S. patent application Ser. No. 564,087, filed Apr. 1, 1975 by the same inventors herewith. The subject matter of that application is incorporated herewith by reference. As illustrated in FIG. 4, surplus electrical power generated during off peak demand periods is coupled to the chlorine-sodium hydroxide electrolysis cell 14 to therey generate chlorine and hydrogen which is stored, then coupled to the reactor chamber 32 via lines 21 and 22 during peak demand periods. As aforementioned, the output of the reactor chamber drives a turbine which in turn drives a power take off unit 42. The power take off unit 42 powers a generator 47 which generates electrical power during peak load demand periods so that in effect the electrical energy generated during off peak demand periods is recovered and utilized to provide peak load demands during periods of high power use in the utility system. In addition, the power take off unit 42 drives an atmospheric compressor unit 49 which supplies atmospheric oxygen to the reactor 32 via line 23 to thereby control the reaction of the hydrogen and chlorine within the reactor in a known manner. As illustrated water is coupled to the exhaust chamber 30 via line 29 with the output of the exhaust chamber being coupled to the hydrochloric acid converter unit 25. Coupled to the hydrochloric acid converter unit is sodium hydroxide from the electrolysis cell 14 via line 30a so that in the converter 25 water and NaCl is formed which is coupled back to the chlorine-sodium hydroxide electrolysis unit.

In another embodiment of the invention, the energy stored in the battery supply 45 may be provided by a portable battery unit rather than, for example, the rectified output of a utility power generator. In such a circumstance, if the reactor engine was made small enough and encased for example in metal such as a standard propulsion turbine engine, the system of FIG. 4 could be mounted for propulsion purposes in an aircraft, ship or in land vehicles.

Figure 5:
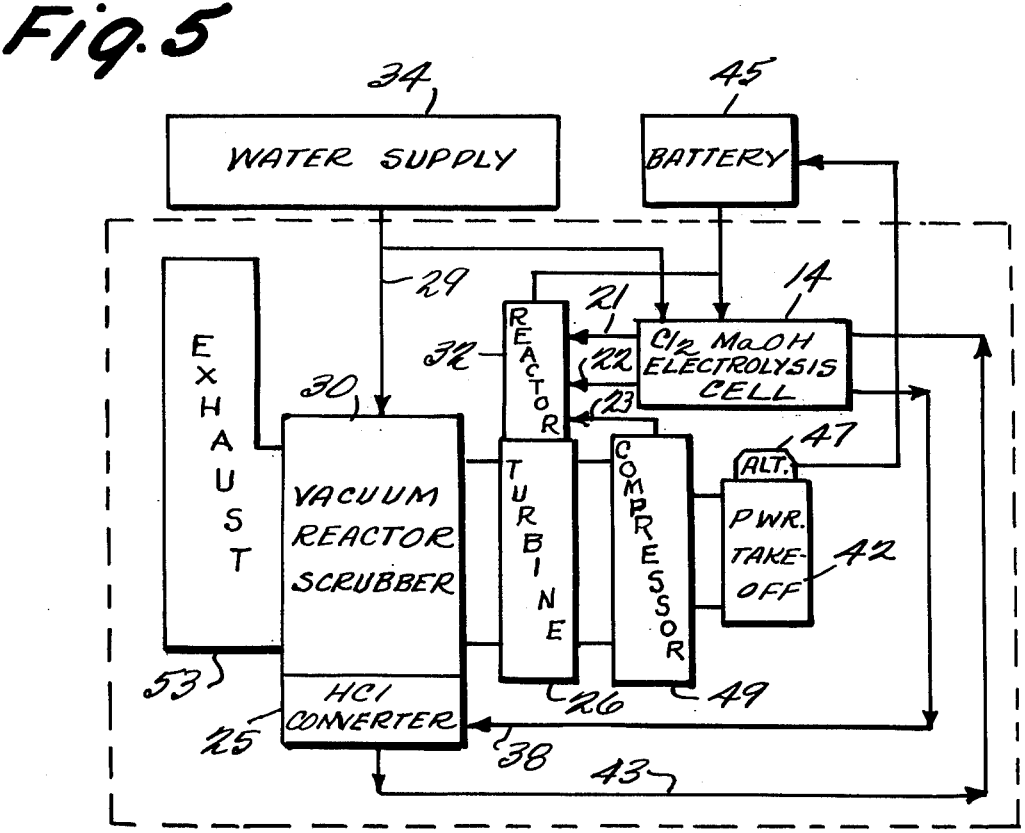
FIG. 5 is a block diagram of an alternate embodiment of the solar reactor engine of the present invention.

Refer now to FIG. 5 where there is disclosed a block diagram of an alternate embodiment of the solar reactor engine of the present invention. As illustrated in this embodiment, the atmospheric compressor 49 is an integral component of a gas turbine engine. The compressor 49 compresses a large volume of air which is heated in the compression process. The heated air (atmospheric oxygen) is injected into the solar reactor chamber where it is further heated and expanded by the exothermic reaction between the hydrogen and chlorine when exposed to intense light. The expanded air along with the hydrogen chloride, which is generated with explosive pressures and heats, is exhausted from chamber 32 into a vacuum reactor scrubber 30 via gas turbine assembly 26. The gas turbine assembly may be of any suitable type known in the art. As the hydrogen chloride gas enters the vacuum reactor scrubber 30, tubes 29 convey water to water jets (not shown) which spray water into the chamber. The hydrogen chloride combines instantly with the water and forms hydrochloric acid. The atmospheric gases are partially cooled by the water. The reaction partially evacuates the chamber, leaving hydrochloric acid in the base of the chamber and passing cooled atmospheric gases into the atmosphere via flue exhaust chamber 53. The hydrochloric acid drops via ports into a sodium hydroxide-hydrochloric acid reactor 25. The sodium hydroxide is fed into reactor 25 via tube 38 from a chlorine-sodium hydroxide cell. The hydrochloric acid is mixed with the sodium hydroxide, producing water and sodium chloride. The water and sodium chloride are fed from reactor 25 to a chlorine-sodium hydroxide cell, via tube 43. The water and sodium chloride are converted into fuel and/or reactants, hydrogen and chlorine, and sodium hydroxide. The process is continuously repeated.

The heated air and pressure from compressor 49 and reactor chamber 32 provide explosive energies to drive turbine assembly 26, which in turn drives a power generator via power take off 42. The evacuation scrubber chamber 30 cools the exhaust air (atmospheric gases) and converts the hydrogen chloride into hydrochloric acid, creating a partial vacuum exhaust and increasing the efficiency of turbine assembly 26.

While the present invention has been disclosed in connection with a preferred embodiment thereof, it should be understood that there may be other variations of the invention which fall within the spirit and scope thereof as defined by the appended claims.

What is claimed is:

1. A solar reactor engine comprising:
   a solar reactor chamber,
   means for controllably coupling chlorine and hydrogen to said solar reactor chamber,
   means for controllably coupling oxygen to said solar reactor,
   means for directing electromagnetic radiation into said chamber to thereby exothermicly react said hydrogen and chlorine in the presence of said oxygen to generate hydrogen chloride at a high pressure and temperature level,
   a turbine forming at least a portion of at least one wall of said reaction chamber,
   said pressurized hydrogen chloride driving said turbine,
   said turbine driving a power utilization device,
   an exhaust chamber positioned on the side of said turbine opposite from said reactor chamber,
   means for converting said hydrogen chloride to hydrochloric acid to thereby form a partial vacuum in said exhaust chamber,
   said partial vacuum increasing the pressure differential across said turbine to thereby increase the efficiency thereof, and
   means for conveying said hydrochloric acid away from said exhaust chamber.

2. The solar reactor engine of claim 1 further comprising means for coupling oxygen to said reactor chamber to thereby control the combination of said hydrogen and said chlorine.

3. The solar reactor engine of claim 2 further comprising means for coupling sodium hydroxide with said hydrochloric acid to thereby produce water and sodium chloride.

4. The apparatus of claim 3 wherein said electromagnetic radiation is solar radiation.

5. The apparatus of claim 4 further comprising means for concentrating said electromagnetic radiation, means for directing said concentrated radiation into said chamber, and means for dispersing said radiation in said chamber so that said radiation is dispersed throughout the chamber.

6. The solar reactor of claim 3, wherein said electromagnetic radiation is generated by a carbon arc ignitor.

7. A solar reactor engine system comprising:
   a chlorine-sodium hydroxide electrolysis cell,
   means for generating an electrical current,
   means for conducting said electrical current to said chlorine-sodium hydroxide electrolysis cell,
   means for generating chlorine and hydrogen in said electrolysis cell,
   said hydrogen and chlorine generating means being energized by said electrical current,
   a solar reactor chamber,
   means for controllably coupling said chlorine and hydrogen to said solar reactor chamber,
   means for coupling oxygen to said solar reactor, means for directing electromagnetic radiation into said chamber to thereby exothermicly react said hydrogen and chlorine in the presence of said oxygen to generate hydrogen chloride at high temperature and pressures, a turbine forming at least a portion of at least one wall of said reactor chamber, said pressurized hydrogen chloride driving said turbine, said turbine driving a power utilization device, an exhaust chamber positioned on the side opposite said turbine from said reactor chamber, means for converting said hydrogen chloride to hydrochloric acid to thereby form a partial vacuum in said exhaust chamber, said partial vacuum increasing the pressure differential across said turbine to thereby increase the efficiency thereof, means for conveying said hydrochloric acid from said exhaust chamber to an output container, means for coupling sodium hydroxide to said output container to thereby produce water and sodium chloride, and means for coupling said water and sodium chloride to said chlorine-sodium hydroxide cell.

8. The solar reactor engine of claim 7, wherein said solar reactor chamber is enclosed by means of a metallic encasing and wherein said power utilization device includes a propulsion means.

9. The solar reactor engine of claim 8, wherein said power utilization device further includes an electrical generator.

10. The solar reactor engine of claim 9, wherein said means for directing electromagnetic radiation into said chamber includes a light generating means positioned proximate said reactor chamber, said light generating means directing light into said chamber to sustain said exothermic reaction.

11. The solar reactor engine of claim 10, further comprising means for dispersing said electromagnetic radiation throughout said solar reactor chamber.

12. The solar reactor engine of claim 7 wherein said means for coupling oxygen to said solar reactor comprises a compressor, said compressor being driven by said turbine and forces oxygen under pressure into said reactor chamber.

13. The solar reactor engine of claim 12 wherein said compressor compresses atmospheric air and forces said compressed air into said reaction chamber.

* * * * *